(12) United States Patent
MacKenzie

(10) Patent No.: US 10,028,074 B2
(45) Date of Patent: Jul. 17, 2018

(54) GROUP-BASED MACHINE TO MACHINE COMMUNICATION

(71) Applicant: IOT HOLDINGS, INC., Wilmington, DE (US)

(72) Inventor: James A. MacKenzie, Berwyn, PA (US)

(73) Assignee: IOT Holdings, Inc., Wilmington, DE (US)

( * ) Notice: Subject to any disclaimer, the term of this patent is extended or adjusted under 35 U.S.C. 154(b) by 297 days.

(21) Appl. No.: 14/856,961

(22) Filed: Sep. 17, 2015

(65) Prior Publication Data

US 2016/0007139 A1 Jan. 7, 2016

Related U.S. Application Data

(63) Continuation of application No. 13/018,209, filed on Jan. 31, 2011, now Pat. No. 9,167,517.

(Continued)

(51) Int. Cl.
*G06F 15/16* (2006.01)
*H04W 4/00* (2018.01)
(Continued)

(52) U.S. Cl.
CPC ........... *H04W 4/005* (2013.01); *H04W 4/70* (2018.02); *H04W 52/0216* (2013.01);
(Continued)

(58) Field of Classification Search
CPC ......... H04W 52/0219; H04W 52/0216; H04W 72/04; H04W 72/042; H04W 72/0446; H04W 72/0453
See application file for complete search history.

(56) References Cited

U.S. PATENT DOCUMENTS 5,504,939 A 4/1996 Mayrand et al.
5,765,105 A 6/1998 Kuriki
(Continued)

FOREIGN PATENT DOCUMENTS

JP 08-140136 A 5/1996
JP 2002-325276 A 11/2002
(Continued)

OTHER PUBLICATIONS

3rd Generation Partnership Project (3GPP), S1-100140, "Group Based RAB & IP Assignment for TS 22.368", InterDigital Communication Corporation, 3GPP TSG-SA1 #49, San Francisco, USA, Feb. 22-26, 2010, 2 pages.
(Continued)

*Primary Examiner* — Arvin Eskandarnia
(74) *Attorney, Agent, or Firm* — Condo Roccia Koptiw LLP

(57) ABSTRACT

Methods and apparatus are provided for performing group-based machine-to-machine (M2M) communication. Machine-type communication (MTC) wireless transmit/receive units (WTRUs) may operate in M2M groups. MTC WTRUs belonging to the same M2M group may receive a broadcast message with a time window on a channel dedicated for receiving data directed to an M2M group. The MTC WTRUs may wake up during the time window and may receive data directed to an M2M group on a dedicated channel. The broadcast message may be broadcasted via a broadcast server upon a request from an MTC server. The time window is allocated upon a request from an MTC server on behalf of the M2M group.

18 Claims, 12 Drawing Sheets

Related U.S. Application Data

(60) Provisional application No. 61/299,638, filed on Jan. 29, 2010.

(51) Int. Cl.
| | | |
|---|---|---|
| *H04W 52/02* | (2009.01) | |
| *H04W 72/04* | (2009.01) | |
| *H04W 4/70* | (2018.01) | |
| *H04W 8/18* | (2009.01) | |
| *H04W 92/18* | (2009.01) | |
| *H04W 4/08* | (2009.01) | |

(52) U.S. Cl.
CPC ... *H04W 52/0219* (2013.01); *H04W 52/0229* (2013.01); *H04W 72/0446* (2013.01); *H04W 4/08* (2013.01); *H04W 8/186* (2013.01); *H04W 72/042* (2013.01); *H04W 72/0453* (2013.01); *H04W 92/18* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/23* (2018.01)

(56) References Cited

U.S. PATENT DOCUMENTS

| | | | |
|---|---|---|---|
| 6,005,848 | A | 12/1999 | Grube et al. |
| 6,308,079 | B1 * | 10/2001 | Pan .................... H04M 3/56 |
| | | | 455/416 |
| 6,553,228 | B1 | 4/2003 | Kotzin |
| 7,072,340 | B2 | 7/2006 | Agrawal et al. |
| 7,292,868 | B2 | 11/2007 | Laroia et al. |
| 7,962,573 | B2 | 6/2011 | Connelly |
| 8,072,948 | B2 | 12/2011 | Shaheen |
| 8,219,121 | B2 | 7/2012 | Sim et al. |
| 8,254,874 | B1 | 8/2012 | Oroskar et al. |
| 8,665,802 | B2 | 3/2014 | Lee et al. |
| 8,737,989 | B2 | 5/2014 | Luft |
| 8,780,796 | B1 | 7/2014 | Ballal et al. |
| 8,891,423 | B2 | 11/2014 | Shaheen et al. |
| 2003/0016632 | A1 | 1/2003 | Refai et al. |
| 2003/0203740 | A1 | 10/2003 | Bahl et al. |
| 2004/0264397 | A1 | 12/2004 | Benveniste |
| 2005/0018624 | A1 | 1/2005 | Meier et al. |
| 2005/0060551 | A1 | 3/2005 | Barchi et al. |
| 2005/0209839 | A1 * | 9/2005 | Nightingale et al. ........... 703/19 |
| 2006/0104225 | A1 | 5/2006 | Kim et al. |
| 2006/0140149 | A1 | 6/2006 | Kim et al. |
| 2007/0019643 | A1 | 1/2007 | Shaheen |
| 2008/0081645 | A1 | 4/2008 | Kim et al. |
| 2008/0291872 | A1 | 11/2008 | Henriksson |
| 2011/0045763 | A1 | 2/2011 | Mohanty et al. |
| 2011/0106952 | A1 | 5/2011 | Doppler et al. |
| 2011/0161503 | A1 | 6/2011 | Krebs |
| 2012/0004003 | A1 | 1/2012 | Shaheen et al. |
| 2012/0196570 | A1 | 8/2012 | Lindholm et al. |
| 2012/0213185 | A1 | 8/2012 | Frid |
| 2012/0214520 | A1 | 8/2012 | Bergqvist et al. |
| 2014/0135044 | A1 * | 5/2014 | Bergqvist et al. ............ 455/458 |
| 2014/0213237 | A1 * | 7/2014 | Yang et al. ................... 455/418 |

FOREIGN PATENT DOCUMENTS

| | | | |
|---|---|---|---|
| JP | 2008-294821 | A | 12/2008 |
| JP | 2011-530909 | A | 12/2011 |
| KR | 10-2011-0053240 | A | 5/2011 |
| KR | 10-1405685 | B1 | 6/2014 |
| WO | WO 2010/017913 | A1 | 2/2010 |
| WO | WO 2011/089464 | A1 | 7/2011 |

OTHER PUBLICATIONS

3rd Generation Partnership Project (3GPP), TD S2-097483, "Network Improvements for Low Data Usage", Huawei, 3GPP TSG SA WG2 Meeting #76, San Jose Del Cabo, Nov. 16-20, 2009, pp. 1-2.

3rd Generation Partnership Project (3GPP), TD S2-101007, "Device Based Optimization Solution for Smart Metering support in 3GPP System", InterDigital Communication Corporation, 3GPP TSG SA WG2 Meeting #78, San Francisco, USA, Feb. 22-26, 2010, pp. 1-4.

3rd Generation Partnership Project (3GPP), TD S2-101008, "Network Based Optimization Solution for Smart Metering Support in 3GPP System", InterDigital Communication Corporation, 3GPP TSG SA WG2 Meeting #78, San Francisco, USA, Feb. 22-26, 2010, pp. 1-5.

3rd Generation Partnership Project (3GPP), TR 22.868 V8.0.0, "Technical Specification Group Services and System Aspects, Study of Facilitating Machine to Machine Communication in 3GPP Systems, (Release 8)", Mar. 2007, pp. 1-15.

3rd Generation Partnership Project (3GPP), TR 23.888 V0.1.1, "Technical Specification Group Services and System Aspects, System Improvements for Machine-Type Communications, (Release 10)", Dec. 2009, pp. 1-12

3rd Generation Partnership Project (3GPP), TR 23.888 V1.0.0, "Technical Specification Group Services and System Aspects, System Improvements for Machine-Type Communications, (Release 10)", Jul. 2010, pp. 1-80.

3rd Generation Partnership Project (3GPP), TS 22.368 V1.1.1, "Technical Specification Group Services and System Aspects, Service Requirements for Machine-Type Communications, Stage 1 (Release 10)", Nov. 2009, pp. 1-23.

3rd Generation Partnership Project (3GPP), TS 22.368 V11.0.0, "Technical Specification Group Services and System Aspects, Service requirements for Machine-Type Communications (MTC), Stage 1 (Release 11)", Dec. 2010, pp. 1-23.

Lin et al., "A Push Mechanism for GPRS Supporting Private IP Addresses", IEEE Communications Letters, vol. 7, No. 1, Jan. 2003, pp. 24-26.

* cited by examiner

GROUP-BASED MACHINE TO MACHINE COMMUNICATION

CROSS-REFERENCE TO RELATED APPLICATIONS

This application is a continuation of U.S. patent application Ser. No. 13/018,209, filed on Jan. 31, 2011, which claims the benefit of U.S. Provisional Application No. 61/299,638 filed on Jan. 29, 2010, which is incorporated herein by reference as if fully set forth.

BACKGROUND

Machine to Machine (M2M) communication (also referred to as "machine-type communications" or "MTC") may be seen as a form of data communication between entities that do not necessarily need human interaction.

M2M communication may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of MTC devices. Additionally, further enhancements to these technologies may provide additional opportunities for the deployment of M2M-based solutions.

Current M2M-based solutions do not adequately address potential congestions on the network that may be caused by a large number of MTC devices performing network registration and/or transmitting data simultaneously. Accordingly, new technology that overcomes this shortcoming in the current technology is needed.

SUMMARY

Methods and apparatus are provided for performing group-based machine-to-machine (M2M) communication. Machine-type communication (MTC) wireless transmit/receive units (WTRUs) may operate in M2M groups. MTC WTRUs belonging to the same M2M group may receive a broadcast message with a time window dedicated for receiving data directed to an M2M group.

In an embodiment, the MTC WTRUs in a M2M group may receive, via broadcast, a time window dedicated for the group to transmit data. For example, an MTC server may request cell resources for the MTC WTRUs in the M2M group to transmit data. The MTC server may provide the cell resources to a broadcast server for broadcasting to the MTC WTRUs in the M2M group. The MTC server may also provide the M2M group, via broadcast, a time window allocated for the M2M group to transmit data. The time window may include multiple time slots, with each time slot allocated for an individual MTC WTRU in the group to transmit data. Individual MTC WTRUs may wake up and transmit data during their respective time slots using the cell resources requested by the MTC server.

In an embodiment, when an MTC WTRU wakes up during its respective time slot, the MTC WTRU may listen on a paging channel and may receive a page from an MTC user. The page may include information that may prompt the MTC WTRU to connect to the network, the MTC server and/or the MTC user. Upon receipt of the page, the MTC WTRU may request dedicated radio resources from the access network such that the MTC WTRU may communicate with the MTC user 504 as an individual WTRU.

In an embodiment, the MTC WTRUs may receive group-based data from the MTC user. A time window may be set up for the MTC WTRUs in the group to receive the data at the same time. The time window may be broadcasted to the M2M group. The MTC WTRUs in the group may wake up during the time window and may receive data directed to an M2M group on a dedicated channel.

BRIEF DESCRIPTION OF THE DRAWINGS

A more detailed understanding may be had from the following description, given by way of example in conjunction with the accompanying drawings.

DETAILED DESCRIPTION OF ILLUSTRATIVE EMBODIMENTS

Disclosed herein are method embodiments and apparatus embodiments for performing group-based machine-to-machine communication. In an embodiment, machine-type communication (MTC) wireless transmit/receive units (WTRUs) may operate in M2M groups. MTC WTRUs belonging to the same M2M group may receive a broadcast message with a time window dedicated for receiving data directed to an M2M group. The broadcast message may be broadcasted via a broadcast server upon a request from an MTC server. The time window may be allocated upon a request from an MTC server on behalf of the M2M group. The MTC WTRUs may wake up during the time window and may receive data directed to an M2M group on a dedicated channel.

Figure 1A:
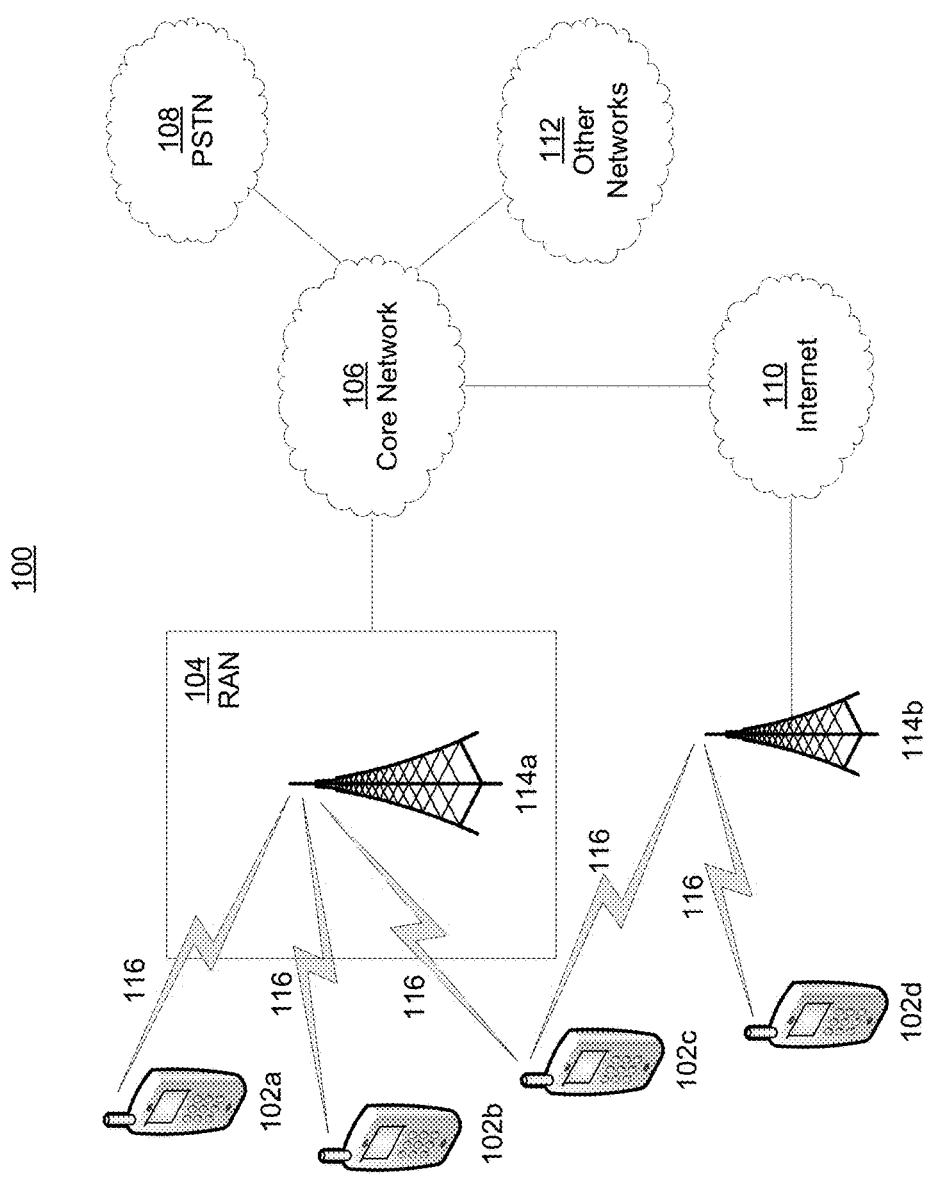
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
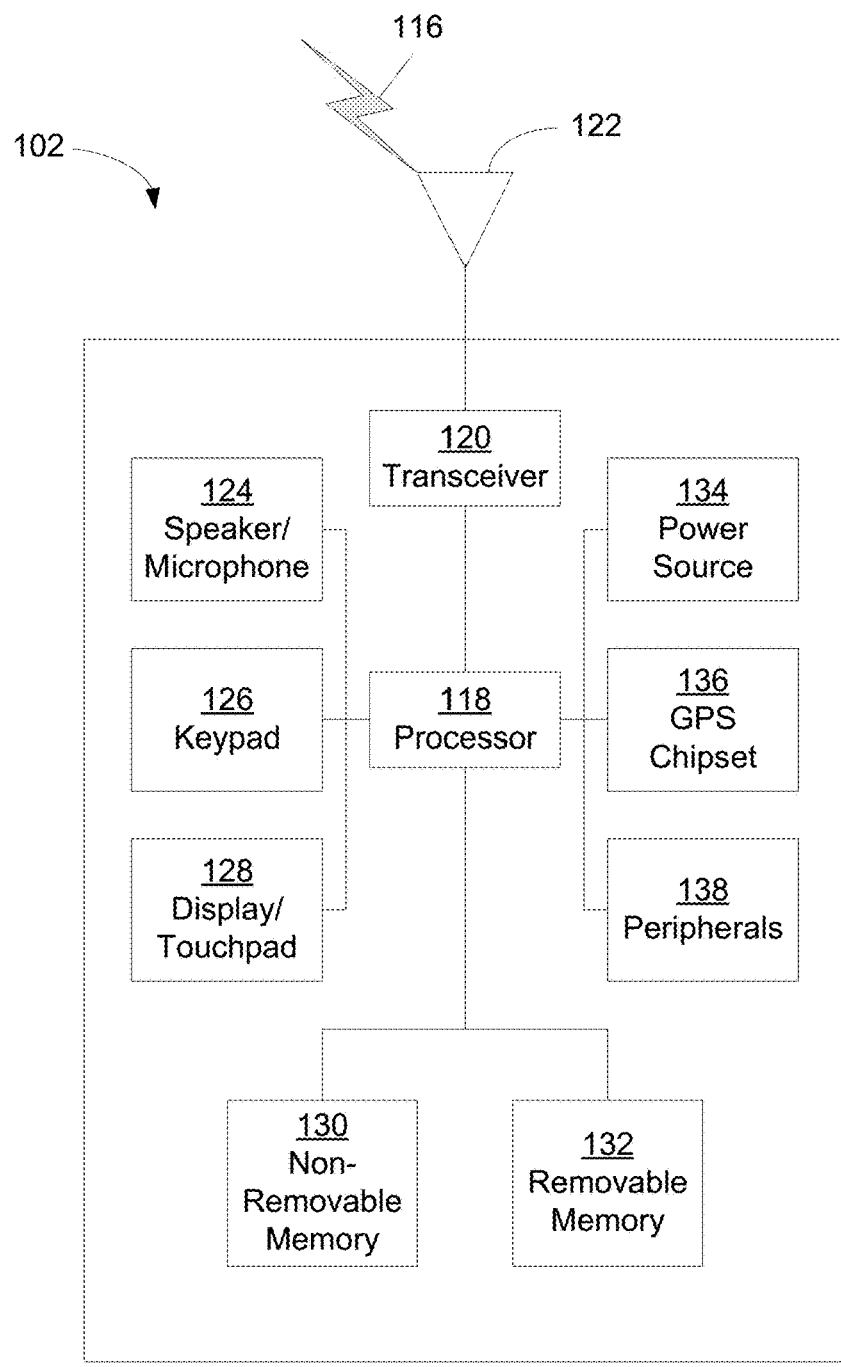
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
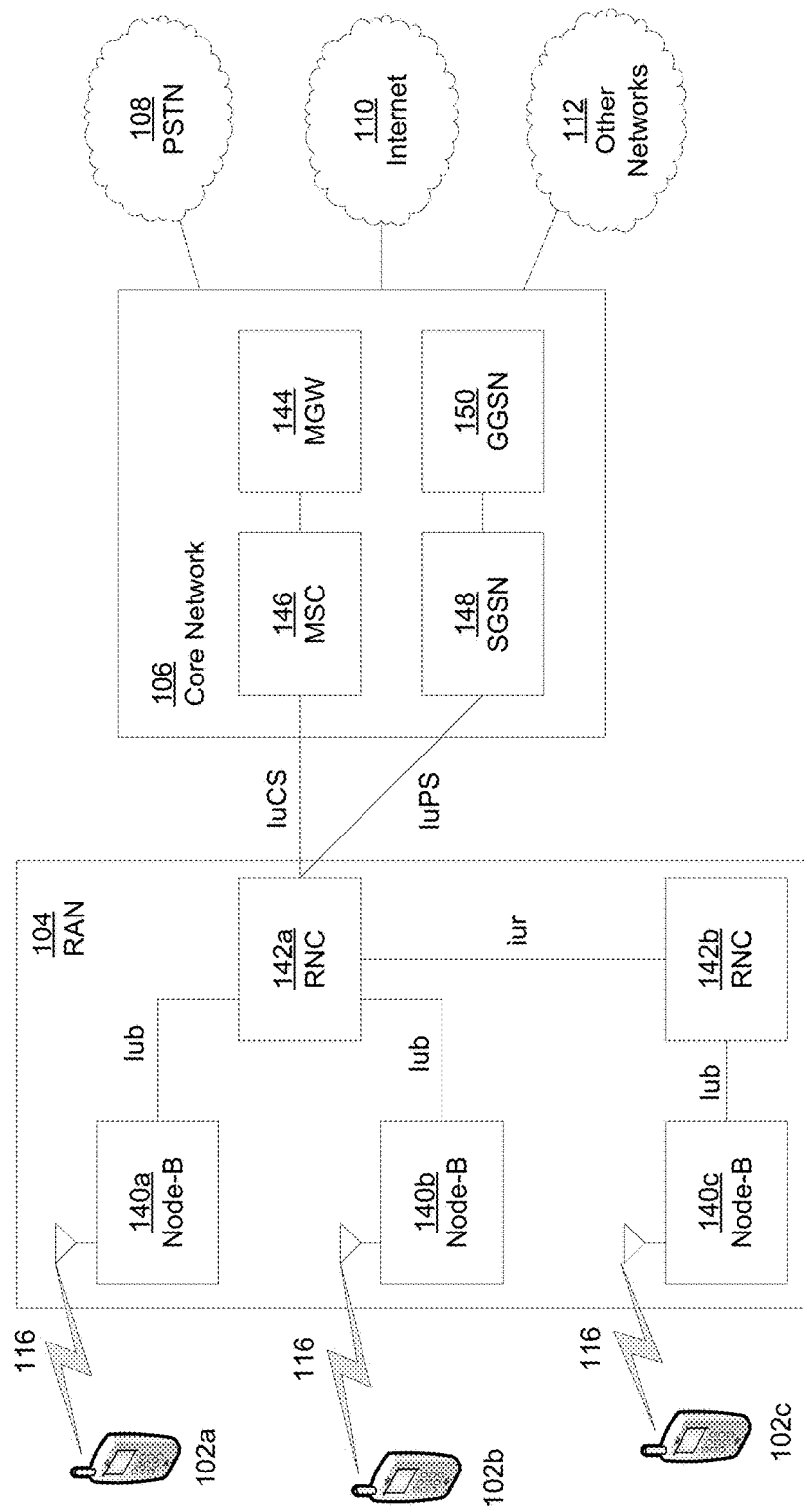
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
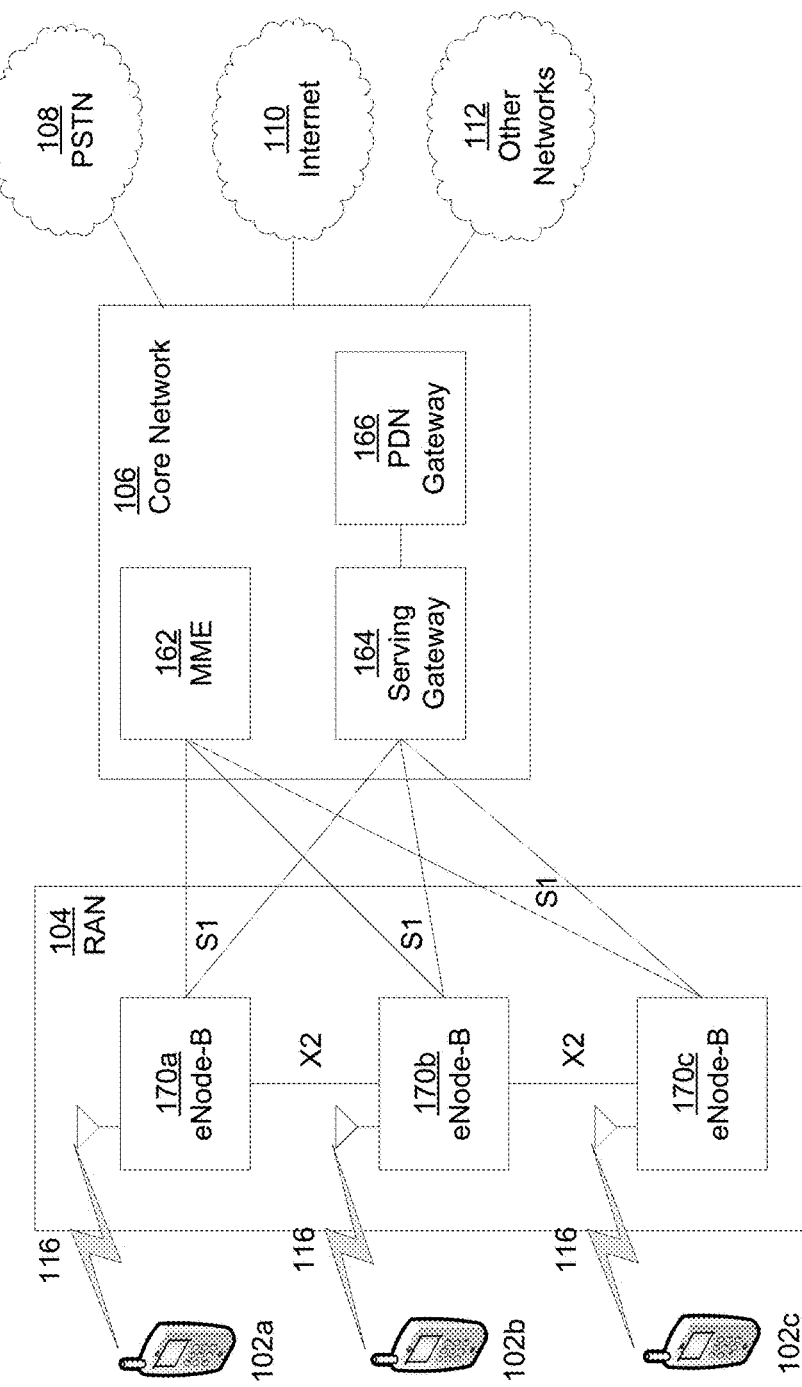
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 170a, 170b, 170c, though it will be appreciated that the RAN 104 may include any number of eNode-Bs while remaining consistent with an embodiment. The eNode-Bs 170a, 170b, 170c may each include one or more transceivers for communicating with the WTRUs 102a, 102b, 102c over the air interface 116. In an embodiment, the eNode-Bs 170a, 170b, 170c may implement MIMO technology. Thus, the eNode-B 140a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170a, 170b, 170c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 170a, 170b, 170c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
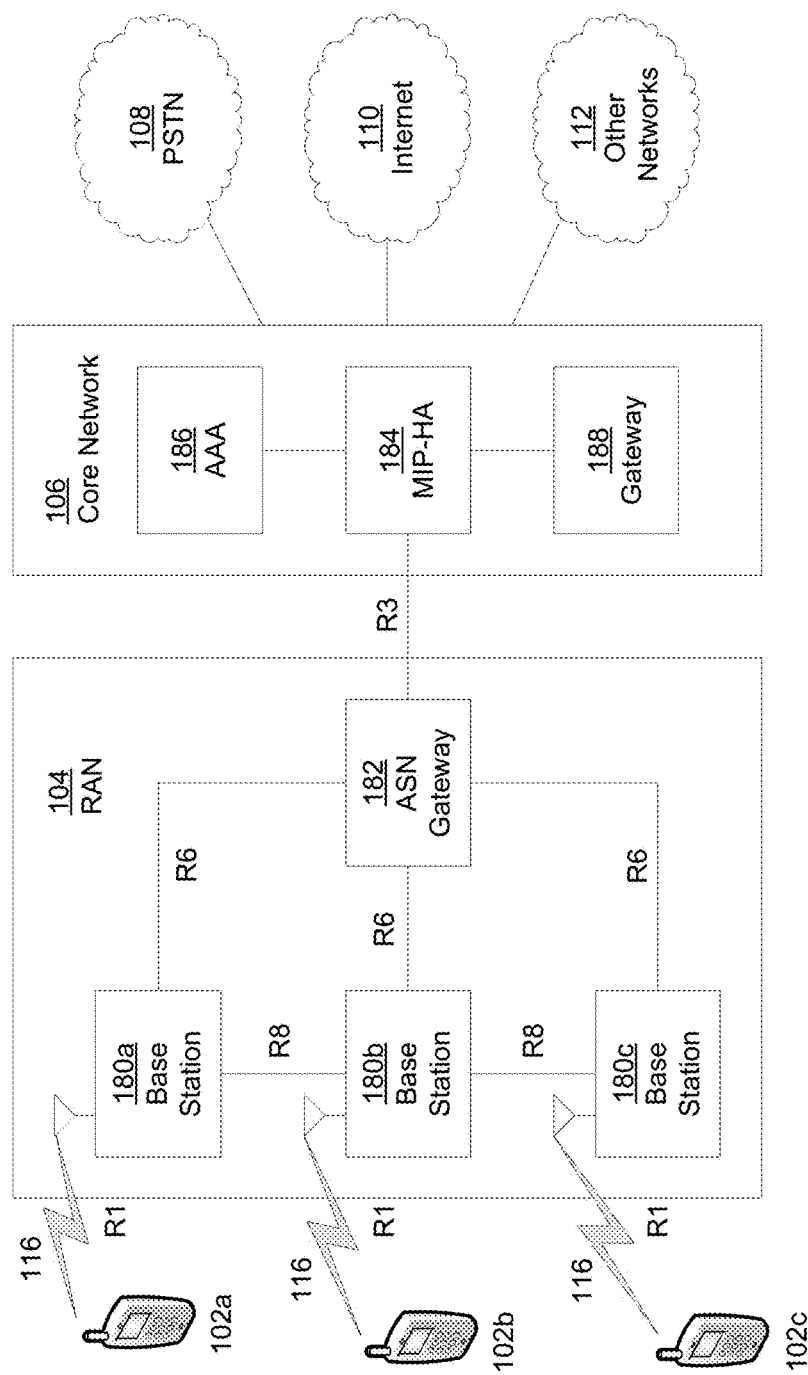
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 142, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180a, 180b, 180c may implement MIMO technology. Thus, the base station 140a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management. The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A "MTC WTRU" or a "M2M WTRU" may include a WTRU capable of communicating using MTC/M2M technology. For example, the MTC WTRU and/or M2M WTRU, may include a WTRU, such as the one described in connection with FIGS. 1A-E, capable of communicating using MTC/M2M technology. For example, an MTC WTRU may include an MTC device.

Figure 2:
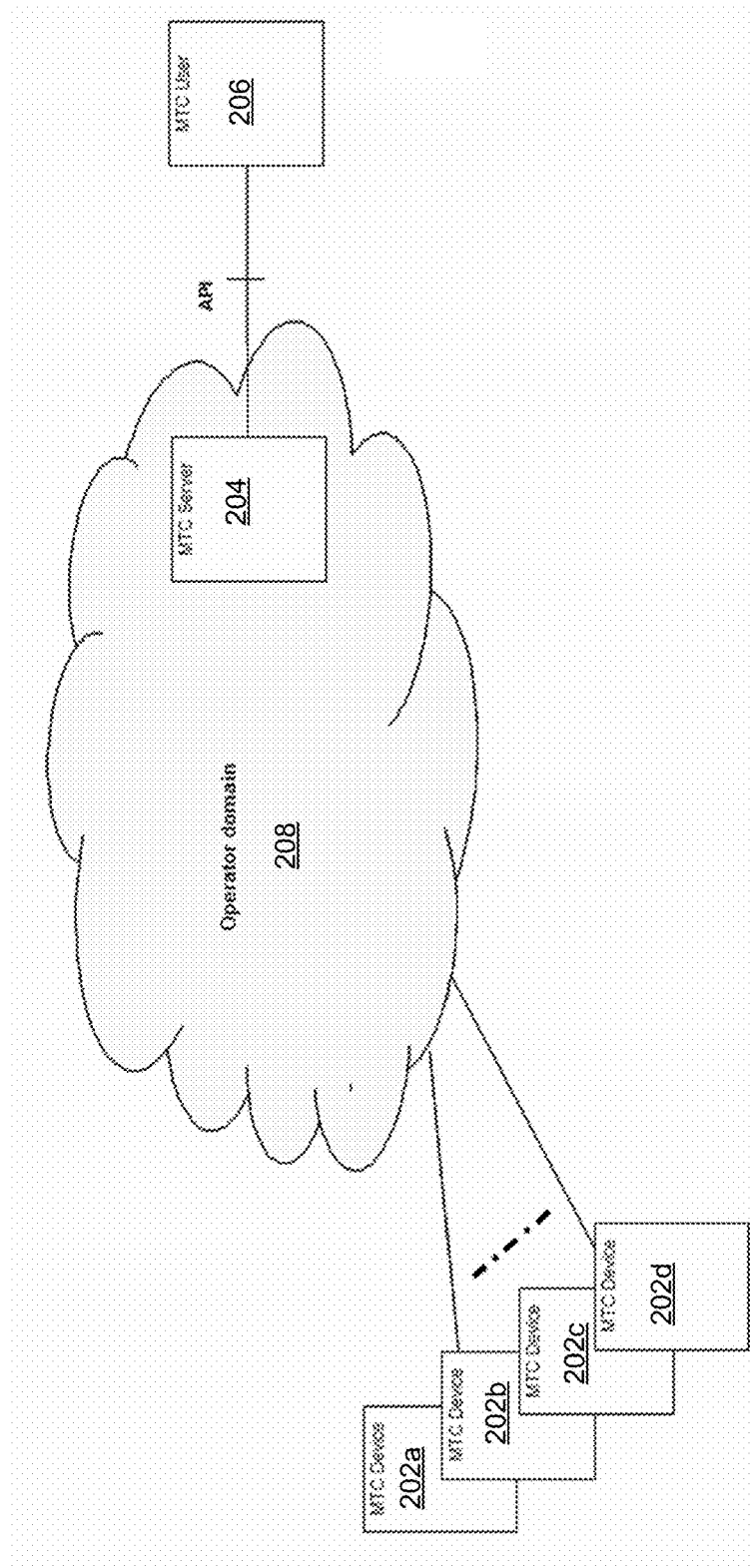
FIG. 2 shows example architecture for MTC communication that includes an MTC server inside an operator domain.

FIG. 2 illustrates example architecture for use in MTC communication. As shown, one or more MTC devices such as MTC devices 202a, 202b, 202c and 202d may communicate to one or more MTC servers such as MTC server 204 via an operator domain such as operator domain 208. As shown in FIG. 2, the MTC server 204 may be located in the operator domain 208, for example. MTC users such as MTC user 206 may access the MTC server 204, for example, via an application protocol interface (API) such that the MTC user may communicate with MTC devices 202a, 202b, 202c.

Figure 3:
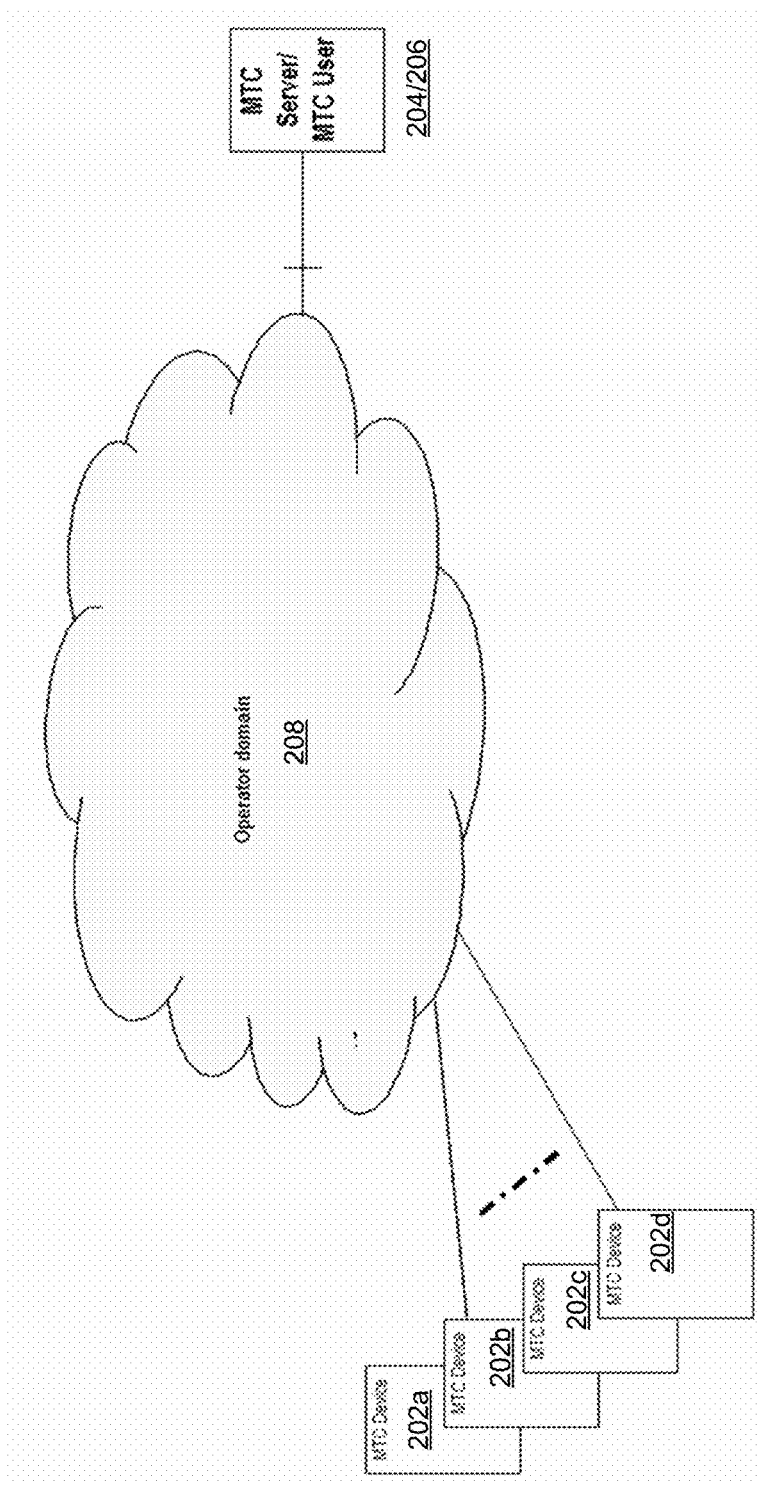
FIG. 3 shows example architecture for MTC communication that includes an MTC server located outside of an operator domain.

FIG. 3 illustrates example architecture for use in MTC communication. As shown, one or more MTC devices such as MTC devices 202a, 202b, 202c and 202d may communicate to one or more MTC servers such as MTC server 204 and/or one or more MTC users such as MTC user 206 via an operator domain such as operator domain 208. The MTC server 204 may be located in the operator domain 208, for example. MTC users such as MTC user 206 may access the MTC server 204, for example, via an application protocol interface (API) such that the MTC user may communicate with MTC devices 202a, 202b, 202c. As shown in FIG. 3, the MTC server 204 may be located outside of the operator domain 208.

Figure 4:
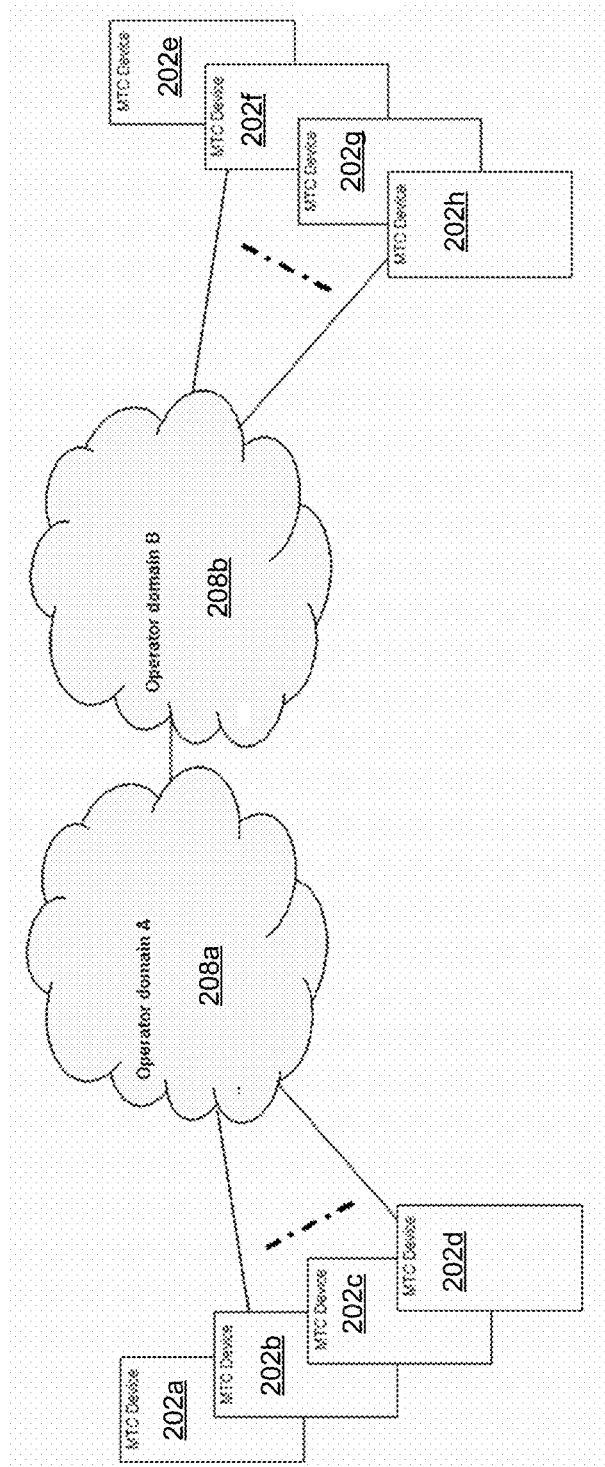
FIG. 4 shows example architecture for MTC WTRU communication wherein MTC WTRUs communicate directly without an intermediate MTC server.

FIG. 4 illustrates example architecture for use in MTC communication. As shown, MTC devices communicate with each other (MTC-MTC communication) without an intermediary MTC server. For example and as shown in FIG. 4, one or more MTC devices such as MTC devices 202a, 202b, 202c and 202d may communicate to one or more MTC devices 202d, 202e, 202f and 202g via multiple operator domains such as operator domains 208a and 208b. As shown in FIG. 4, operator domains 208a and 208b may be operatively connected to each other such that MTC devices connected to operator domain 208a may communicate to MTC devices connected to operator domain 208b, and vice versa.

Figure 5:
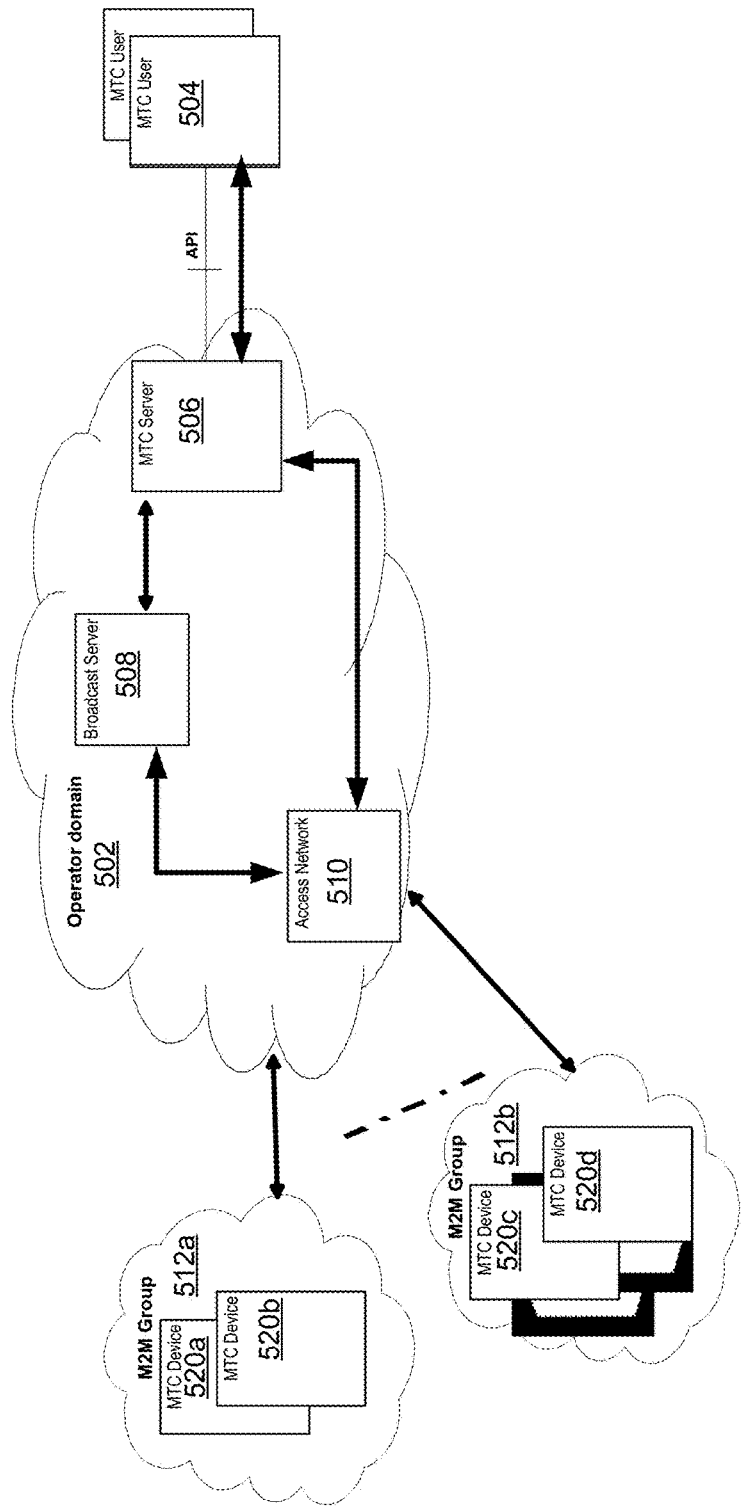
FIG. 5 shows an example architecture for MTC WTRU communication.

FIG. 5 illustrates example architecture for MTC communication. As shown, operator domain 502 may include an MTC server such as MTC server 506, a broadcast server such as broadcast server 508, and an access network 510 such as access network 510. The operator domain may facilitate MTC communication between MTC users such as MTC users 504 and one or more M2M groups such as M2M group 512a and M2M group 512b. The MTC server 506 may include, for example the MTC server 204 described above with respect to FIGS. 2-4. The MTC server 506 may interface to one or more end users such as MTC users 504, for example, via an application programming interface (API). The MTC user 504 may include a MTC user 206 described above with respect to FIGS. 2-4. The MTC user 504 may include a system that may interact with MTC WTRUs 520. For example, the MTC user 504 may include a plurality of computing devices that may pull data from one or more MTC WTRUs 520. The MTC server 506 may maintain an M2M device list that may include MTC WTRUs associated with a system, an application, and/or an MTC user 504. The M2M device list may use device identifiers to identify the MTC WTRUs 520. A device identifier may include, IMSI, device serial number, or any other identifier that may uniquely identify an MTC WTRU 520. The M2M device list may include a description of the MTC WTRU 520. The MTC server 506 may provide routing information for transmitting data amongst the MTC WTRUs 520 and the MTC users 504.

As shown in FIG. 5, MTC WTRUs 520 may operate in groups such as M2M group 512a and M2M group 512b. M2M groups may also be referred to as MTC groups. For example, M2M group 512a may include one or more MTC WTRUs such as MTC WTRUs 520a and 520b. M2M group 512b may include one or more MTC WTRUs such as MTC WTRUs 520c and 520d. MTC WTRUs 520 may include an MTC device 202 as described above with respect to FIGS. 2-4. In an embodiment, MTC WTRUs 520 belonging to the same cell may be grouped into an M2M group 512. In an embodiment, MTC WTRUs 520 located in the same area may be grouped into an M2M group 512. For example, utility meters within a neighborhood may be grouped into an M2M group 512. In an embodiment, the M2M group 512 may be defined based on one or more shared features among MTC WTRUs 520. For example, MTC WTRUs 520 that may use a common application may be classified as a group.

In an embodiment, the MTC WTRUs 520 may communicate with the MTC users 504 via a network M2M service application. The network M2M service application may run on, for example, the MTC server 506. The network M2M service application may manage the process within the network and may provide for the configuration of service and connectivity of the MTC WTRUs 520 to the end user of the service. An MTC WTRU 520 may be identified to the network service application by a unique ID. The unique ID may be included in uplink communications. For example, an MTC server such as the MTC server 506 may keep a list of the MTC WTRUs 520 that may use the network M2M service application/system.

A broadcast service may be allocated for M2M groups 512. The broadcast service may be defined by the network M2M service application. For example, an M2M group 512 may correspond to a service configured on a broadcast channel. In an embodiment, the M2M groups 512 may be handled by the M2M service application. In an embodiment, each MTC WTRU 520 in the group may subscribe to the broadcast service. The MTC WTRUs 520 may determine which broadcast service to listen to. For example, the MTC WTRUs 520 may determine which broadcast service to listen to via an information exchange procedure with the network M2M application or via pre-configuration settings.

As described above, the MTC server 506 may maintain a device list associated with an MTC user such as MTC user 504. The MTC WTRUs 520 may be associated with the MTC user 504 via the network M2M service application. For example, the MTC user 504 may configure the MTC server 506 with a list of MTC WTRUs 520 that the MTC user may be associated with. The MTC server 506 may maintain device data routing information that may indicate how to route communications between the MTC user 504 and MTC WTRUs 520. The MTC server 506 may set up a broadcast channel such that information may be broadcasted to an M2M group 512, for example, via the broadcast server 508.

In an embodiment, the MTC server 506 may maintain a database that may store information related to resource allocation for MTC WTRUs 520 and/or M2M group 512 to receive data, receive pages, and/or transmit data. For example, the database may store information that may include radio resources, time windows and time slots for the MTC WTRUs 520 of M2M group or M2M groups 512.

In an embodiment, an MTC WTRU 520 that may be added to the M2M system may receive MTC user information associated with the MTC user 504. MTC WTRU 520 may be configured with the specific MTC user information. In an embodiment, the MTC WTRU 520 may be programmed with a unique identifier, such as an IMEI in the UMTS system. The MTC WTRU 520 may be programmed with information associated with register and connect to a cellular system/network. For example, the MTC WTRU 520 may be programmed with information that may identify an associated MTC server and/or an associated MTC user. For example, an MTC Server IP Address and an MTC User IP address. The MTC Server IP Address may include an IP of an MTC server such as the MTC server 506 that the MTC WTRU 520 may be associated with. The MTC User IP address may include an IP of an MTC user such as the MTC user 504 that the MTC WTRU 520 may be associated with.

The MTC WTRU 520 may connect to the MTC server 506. For example, the MTC WTRU 520 may connect to the MTC server 506 via packet, circuit switched or other mechanisms such that the MTC WTRU 520 may communicate with the MTC server 506. For example, the MTC WTRU

520 may be powered on, and may register with the cellular system/network. The MTC WTRU 520 may establish an IP connection. Through the IP connection, the MTC WTRU 520 may establish communication with the MTC Server 506 via the programmed MTC Server IP Address. The MTC WTRU 520 may provide the MTC Server 506 with the programmed MTC User IP address and the unique identifier of the MTC WTRU 520.

The MTC Server 506 may establish a connection with the MTC user 504 using the IP address provided. The MTC Server 506 may inform the MTC user 504 that a new MTC WTRU is in the system and may provide the unique identifier of the MTC WTRU 520.

The MTC user 504 may authenticate the MTC WTRU 520. The MTC User may inform the MTC Server 506 of an M2M group such as the M2M groups 512 to associate the MTC WTRU 520 with. Upon validation, the MTC user 504 may re-configure the MTC server 506. For example, the MTC user 504 may instruct the MTC Server 506 to update the device list and routing table maintained by the MTC server 506 to include information associated with the newly added MTC WTRU 520.

In an embodiment, the MTC Server 506 may provide the MTC WTRU 520 with the requirements for operation in the system. The MTC Server 506 may inform the MTC WTRU 520 of an M2M group such as the M2M groups 512 that the MTC WTRU 520 may be associated with. The MTC Server 506 may inform the MTC WTRU 520 of a broadcast service through unique identifiers.

The MTC Server 506 may register the MTC WTRU 520 in a database. For example, the MTC Server 506 may record the routing information for routing data between the MTC WTRU 520 and the MTC User 504. The MTC Sever 506 may add the MTC WTRU 520 to scheduling activity.

In an embodiment, the MTC WTRU 520 may be programmed with an MTC User IP address. The MTC User IP address may include an IP of an MTC user such as the MTC user 504 that the MTC WTRU 520 may be associated with.

For example, the MTC WTRU 520 may be powered on, and may register with the cellular system/network. The MTC WTRU 520 may establish an IP connection. Through the IP connection, the MTC WTRU 520 may establish communication with the MTC user 504 via the programmed MTC User IP Address.

The MTC user 504 may authenticate the MTC WTRU 520. The MTC user 504 may inform the MTC Server 506 of the addition of the MTC WTRU 520. The MTC user 504 may request the MTC Server 506 to associate the MTC WTRU 520 with a specific M2M group such as M2M group 512. The MTC user 504 may request the MTC Server 506 to provide the MTC WTRU 520 with requirements for transmit and receive activities.

The MTC Server 506 may inform the MTC user 504 and or the MTC WTRU 520 of a cellular broadcast service identifier. The MTC Server 506 may inform the MTC WTRU 520 of an M2M group such as the M2M groups 512 that the MTC WTRU 520 may be associated with.

In an embodiment, an MTC WTRU 520 that may be added to the M2M system may receive MTC user information associated with the MTC user 504. MTC WTRU 520 may be configured with the specific MTC user information. The MTC user 504 may be updated with MTC device information associated with the newly added MTC WTRU 520. The MTC WTRU 520 may be updated with broadcast channel information. For example, the update process may be performed manually. The MTC user 504 may reconfigure the MTC server 506. For example, the device list and routing table maintained by the MTC server 506 may be updated to include information associated with the newly added MTC WTRU 520.

In an embodiment, the MTC Server 506 may request cellular resources in uplink, downlink and/or paging (e.g. cellular channels) to support the activities of the MTC WTRUs 520 that the MTC Server 506 may be associated with. For example, the MTC Server 506 may request cellular resources from the access network or networks. For example, the MTC Server 506 may request cellular resources for the MTC WTRUs 520 registered to the MTC Server 506. The MTC Server 506 may calculate the resources requirements from the sum of the individual MTC WTRU transmit and receive requirements. In an embodiment, the administrative overhead requirements of the system and the M2M groups may be considered in the resources requirement calculation. The MTC Server 506 may periodically or continually reevaluate the cellular resource requirements and release or request addition resources as needed.

The MTC server 506 may provide MTC device uplink scheduling information to the broadcast server 508. The uplink schedule may be dynamically allocated by the MTC Server 506 on an as-needed basis. The device uplink scheduling information may include information associated with when the MTC WTRUs 520 may be scheduled to transmit MTC information to the MTC user 504. For example, device uplink scheduling information may include location of the time window in time, individual MTC WTRU scheduling information such as a time slot for data transmission within the time window. The scheduling information may include information associated with when the MTC WTRUs 520 may wake up to listen for broadcast message(s) that may include scheduling information for subsequent data transmission. The MTC server 506 may provide the received cell resource information and information associated with the time window to the broadcast server 508. The information may be sent via a broadcast message placed on the service. The broadcast server 508 may send the device uplink scheduling information and the cell resource information to the M2M group 512 via a broadcast channel.

The MTC server 506 may provision the M2M groups 512 and/or the MTC WTRUs 520 with time windows or time slots on the cellular channels. The time windows or time slots may be used for data transmission and/or the administrative signaling of the system. In an embodiment, the MTC server 506 may allocate multiple dedicated channels for multiple M2M groups. For example, a dedicated channel may correspond to an M2M group. If a dedicated channel is not fully utilized, the MTC server 506 may bundle the M2M groups and/or the MTC WTRUs 520 into a contiguous block. The MTC server 506 may request resources at the beginning of the block and may give resources back at the end of the block. The MTC Server 506 may periodically recalculate the scheduling to adjust for the availability of cellular resources and the requirements of the MTC WTRUs registered to it. The MTC Server 506 may periodically transmit schedule information to the MTC WTRUs 520 along with the channel information.

In an embodiment, the MTC WTRUs 520 in an M2M group 512 may share a time window and the cell resources for data transmission. The cell resources may be acquired by the MTC Server 506 such that the individual MTC WTRUs 520 may not need to signal the network for cell resources. This may reduce the signaling overhead of the M2M group 512 as a whole, and may reduce the risk of network congestion.

For example, data may be sent to the MTC WTRUs of a specific M2M group or M2M groups on a cellular channel at the same time. The MTC Server 506 may provision a downlink time window to an M2M group 512. An adjacent or immediately contiguous time window may be provisioned to a different M2M Group. In an embodiment, the MTC Server 506 may provide for gaps or guard bands between the time windows allocated to different M2M groups.

For example, a specific MTC WTRU 520 may transmit data to the MTC Sever 506 or MTC User 504. The MTC Server 506 may provision an uplink time slot on a cellular channel to an MTC WTRU. An adjacent or immediately contiguous time slot may be provisioned to a different MTC WTRU. In an embodiment, the MTC Server 506 may provide for gaps (e.g. guard bands) between the time slots. The MTC WTRUs 520 associated with a specific M2M group may be bundled in time together occupying contiguous time slots. In an embodiment, the schedule message may use relative time values to indicate time slots.

For example, a specific MTC WTRU 520 may be paged by the access network or the MTC Server 506. The MTC Server 506 may provision a downlink time slot on a cellular channel to an MTC WTRU such that the MTC WTRU 520 may receive a page. An adjacent or immediately contiguous time slot may be provisioned to a different to a different MTC WTRU 520. In an embodiment, the MTC Server 506 may provide for gaps (e.g. guard bands) between the time slots. The MTC WTRUs 520 associated with a specific M2M group 512 may be bundled in time together occupying contiguous time slots.

The uplink time slot and down link times slot for an MTC WTRU may be organized in time. For example, the uplink time slot and down link times slot for an MTC WTRU may be organized in time such that the time the MTC WTRU 520 may need to be in an awake state and/or the number of times per cycle the MTC WTRU 520 may need to transition from a sleeping to awake state may be reduced. For example, the uplink time slot and down link times slot for an MTC WTRU 520 may be organized in time such that the downlink and uplink time slot scheduling information may be compressed.

For example, a specific MTC WTRU 520 may receive scheduling information. The MTC Server 506 may create formatted data blocks or messages that may include the aforementioned scheduling and provisioning information. The data blocks or messages may information that may indicate when on the next schedule message may be available (e.g. message chaining).

Figure 8:
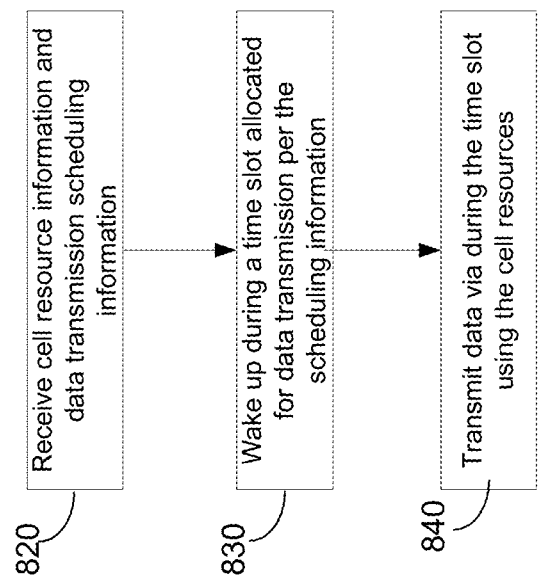
FIG. 8 illustrates an example process for an MTC WTRU to transmit data.

FIG. 8 illustrates an example process for transmitting data. As shown, at 820, cell resource information and data transmission scheduling information may be received via broadcast.

In an embodiment, the MTC server 506 may request cell resources on behalf of the MTC WTRUs 520 in the M2M group 512 and/or multiple groups. For example, the MTC server 506 may send a resource request for an uplink and/or downlink dedicated channel to the access network 510, and may receive cell/radio resource information from the access network. The cell resource information may include information that the MTC WTRU 520 may need to use the cell resources such as channel(s) acquired by the MTC Server 506 for their use. For example, the cell/radio resource information may include information that may identify the channel shared among the MTC WTRUs 520 in the M2M group 512.

In an embodiment, the cell/radio resources and the scheduling information may be sent via separate messages carried by different channels. For example, the scheduling information may be too large for the broadcast channel. The channel information and a pointer to a dedicated channel and time may be provided in the broadcast message.

At 830, individual MTC WTRUs 520 may wake up during their respective time slots allocated for data transmission in accordance with the scheduling information. In an embodiment, the MTC WTRUs 520 may be connected to the operator domain 502 as a group during a pre-scheduled wakeup time. For example, the MTC WTRU 520s may determine the wakeup time based on a previously received broadcast message. In an embodiment, the broadcast message may include a location in time of the next broadcast message. The MTC WTRU 520 may determine its sleep cycle based on the timing of the next broadcast message such that the next broadcast message may be received.

For example, the MTC WTRUs 520 may wake up and listen on the broadcast channel. An MTC WTRU 520 may receive a broadcast message. The broadcast message may include the cell/radio resource information and scheduling information for data transmission. Based on the received broadcast, the MTC WTRU 520 may identify a time slot within the shared time window for uplink data transmission, and may go to sleep. The MTC WTRU 520 may wake up during its respective time slot.

At 840, data may be transmitted during the time slot in accordance with the received cell resources. In an embodiment, the data may be sent to the MTC server 506. The MTC server 506 may route the data to the corresponding MTC user such as MTC user 504 in accordance with the pre-configured routing table.

Figure 6:
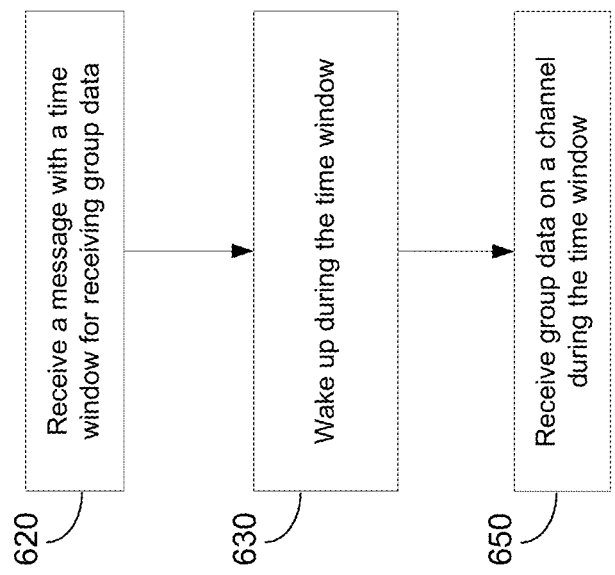
FIG. 6 illustrates an example process for receiving downlink data directed to an MTC WTRU group.

FIG. 6 illustrates an example process for receiving downlink data directed to the MTC WTRU group 512. For example, the downlink data may include a schedule message for a corresponding uplink channel. The downlink data may include a command to the MTC WTRUs 520 in the group. The downlink data may be originated from the MTC User 504. The downlink data may be generated by the MTC Server 506. For example, the MTC Server 506 may construct one or more messages for the M2M group 512 that may include administrative information. The administrative information may include scheduling information. Scheduling information may include the time windows and the channels for the MTC WTRUs 520 to receive data, a page, and/or transmit data.

As shown, at 620, a broadcast with a time window for receiving group data may be received.

In an embodiment, the MTC user 504 may transmit group-based data to MTC WTRUs 520 in an M2M group 512. For example, when the MTC user 504 needs to send large blocks of data to MTC WTRUs 520 in an M2M group 512, a time window may be set up for the MTC WTRUs 520 in the group to receive the data at the same time. The time window may be dynamically allocated by the MTC Server 506 on an as-needed basis, and information associated with the time window may be provided to the MTC WTRUs 520 via broadcast.

For example, the MTC user 504 may send MTC group data to the MTC server 506. The MTC server 506 may acquire cell resources and may (if it does not have pre-allocated resources available) allocate a time frame during on the cell resources for transmitting the downlink data to the MTC WTRUs 520 in the group. In an embodiment, the cell resources may be pre-allocated. The group downlink data transmission scheduling information may include information associated with the MTC WTRUs 520 sharing the time window and cell resources. For example, group downlink data transmission scheduling information may include the location of the time window in time, channel configuration information and radio resource information.

The MTC server 506 may provide the MTC device group downlink data scheduling information to the broadcast server 508. The broadcast server 508 may broadcast, via a broadcast channel that the MTC WTRUs 520 may listen on, the group downlink data scheduling information. The MTC WTRUs 520 may listen on the broadcast channel and may receive the broadcasted scheduling information. In an embodiment, the broadcast message may include a location in time of the next broadcast message. The MTC WTRU 520 may determine its sleep cycle based on the timing of the next broadcast message such that the next broadcast message may be received.

As shown in FIG. 6, at 630, the MTC WTRUs 520 may wake up during the time window. During the time window, the MTC WTRUs 520 may be connected to the network such as the access network 510 as a group.

At 650, MTC group data may be received on a channel during the time window. In an embodiment, the channel may be dedicated to the MTC WTRU group 512. For example, upon receipt of the MTC group data from the MTC User 504 or upon generation of the MTC group data by the MTC Server 506, the MTC server 506 may request cell resources for the MTC WTRUs 520 to receive the MTC group data. For example, the MTC server 506 may send a cell resource request to the access network 510 such that the MTC WTRUs 520 in the M2M group 512 may receive the MTC group data on a dedicated channel. The access network 510 may provide the cell resource information based on the request to the MTC server 506. The cell resource information may include information that may indicate the dedicated channel allocated to the MTC WTRU group 512 for receiving data during the time window.

In an embodiment, the MTC server 506 may determine whether cell resources that may be originally allocated for another M2M group may be used for the MTC WTRU group 512 for receiving data. If the cell resources originally allocated for another M2M group are suitable for the MTC WTRU group 512, the MTC server 506 may reused the cell resources for the MTC WTRU group 512. If the cell resources originally allocated for another M2M group are not suitable for the MTC WTRU group 512, the MTC server 506 may return the cell resources and may request new cell resources for the MTC WTRU group 512.

The MTC Server 506 may allocate a timeslot or window for the MTC WTRUs 520 to receive the data on the allocated cell resources. The MTC server 506 may provide the cell resource information and the scheduling information that may include time window location to the broadcast server 508. The broadcast server 508 may broadcast the cell resource information, via a broadcast channel that the MTC WTRUs 520 may listen on. MTC WTRUs 520 may receive the MTC group data on the dedicated channel indicated in the received cell resources information at the allocated time.

In an embodiment, an MTC WTRU 520 may be paged individually. For example, the MTC user 504 may page an individual MTC WTRU such as MTC WTRU 520d.

Figure 7:
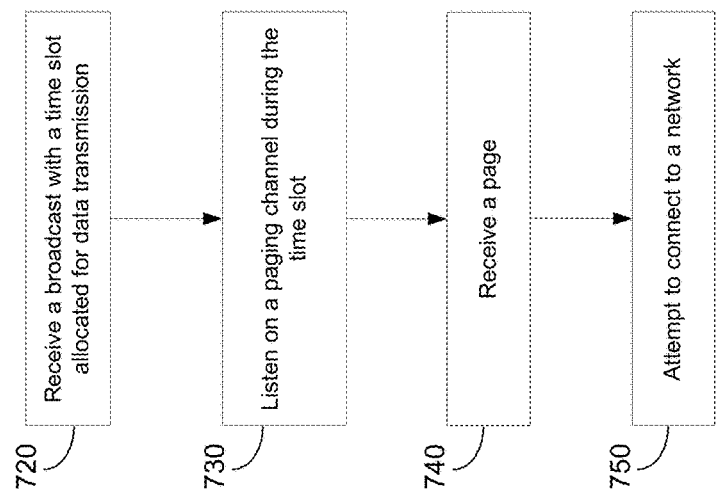
FIG. 7 illustrates an example process for exchanging data with an MTC user as an individual MTC WTRU.

FIG. 7 illustrates an example process for exchanging data with an MTC user as an individual MTC WTRU. As shown, at 720, a broadcast message with a time slot allocated for data transmission may be received. For example, the MTC server 506 may send a cell resource request for an uplink channel to the access network 510, and may receive cell resource information from the access network. The MTC server 506 may provide the received cell resource information and MTC data transmission scheduling information to the broadcast server 508. The broadcast server 508 may send the MTC data transmission scheduling information and/or the cell resource information to the M2M group 512 via a broadcast channel.

At 730, the MTC WTRU 520 may listen on a paging channel during the time slot allocated for the MTC WTRU 520 to send and/or receive data. The WTRU 520 may be connected to the operator domain 502 as a group during a pre-scheduled wakeup time. The MTC WTRU 520 may receive the broadcasted the cell/radio resources and scheduling information for uplink data transmission. As described above, the cell/radio resources and scheduling information may include a time window shared amongst the MTC WTRUs 520 in the M2M group 512. The time window may include multiple time slots, with each time slot allocated for an individual MTC WTRU in the group. Based on the received broadcast, the MTC WTRU 520 may identify a time slot allocated for the MTC WTRU 520 within the shared time window. The MTC WTRU 520 may go to sleep. The MTC WTRU 520 may wake up during the time slot allocated to the particular MTC WTRU 520, and may listen on a paging channel.

At 740, the MTC WTRU 520 may receive a page during a time slot allocated for the MTC WTRU 520 to send and/or receive data. The MTC WTRU 520 may receive the page via the paging channel. The page may be originated from an MTC user such as the MTC user 504 associated with the MTC WTRU 520 described above in conjunction with FIG. 5. In an embodiment, the MTC user 504 may send an M2M page directed to the MTC WTRU 520 to the MTC server 506. For example, the M2M page may include a type II page. The MTC server 506 may send the M2M page to the MTC WTRU 520 via the access network 510 during a time slot allocated to the particular MTC WTRU 520. For example, the page may be sent via a dedicated paging channel for the M2M group 512. The page may include information that may prompt the MTC WTRU 520 to connect to a network, to the MTC server 506, and/pr to the MTC user 504.

At 750, the MTC WTRU 520 may attempt to connect to a communication network. In an embodiment, the MTC WTRU 520 may exchange data with the MTC user 504 via the MTC server 506. Upon receipt of the page, the MTC WTRU 520 may request radio resources from the access network 510 such that the MTC WTRU 520 may communicate with the MTC Server 506 and thus the MTC user 504 via dedicated resources. The dedicated radio resources may be different than the radio resources shared amongst the MTC WTRUs 520 in M2M group 512. For example, the MTC WTRU 520 may obtain radio resources such that the MTC WTRU 520 may be connect to the MTC server 506 via packet, circuit switched channels (Circuit Switched call control) or other mechanisms. Thus, the MTC user 504 may communicate via the MTC Server 506 with an individual MTC WTRU 520 in an M2M group 512 via radio resources dedicated to the MTC WTRU 520 as an individual WTRU, or as though the MTC WTRU 520 is not part of an M2M group 512.

The MTC Server 506 may periodically provide a subset of the scheduling information to an M2M group. For example, scheduling information to an M2M group 512 may be provide via broadcast such that the MTC WTRUs 520 in an M2M group 512 may identify the downlink time window associated with the M2M group 512. The schedule message may preserve the cellular networks limited broadcast serve resources.

The MTC WTRU 520 may periodically listen to the configured broadcast service. The MTC WTRU 520 may identify a time window and/or cellular resources associated with the M2M Group 512 in the schedule message using the configured M2M group unique identifier.

In an embodiment, the MTC server 506 may send schedule information to a specific M2M group 512 as a formatted data block or message. The schedule information may include schedule and resource information pertinent to the M2M group 512 and the associated MTC WTRUs during the M2M group's provisioned time window over the provisioned downlink channel.

The MTC WTRUs 520 of the M2M Group may wake up on a trigger and may listen during the time window allocated to the M2M group 512 on the downlink channel provided in a previously received schedule message. An MTC WTRU 520 may read and save specific schedule information from the formatted data block, including a time slot on the uplink (e.g. Tx) and downlink (e.g. paging) channel. The MTC WTRU 520 may identify schedule information associated with the MTC WTRU 520 in formatted data block, for example, by using the unique identifier of the MTC WTRU 520. The MTC WTRU 520 may read and save the time and channel information for a next time window allocated to the M2M group 512. The MTC server 506 may provide for time-triggered events to notify the MTC WTRU 520 prior to upcoming uplink and downlink time slots and upcoming time windows. The MTC WTRU 520 may go into a low power mode, such as a sleep mode.

The MTC WTRU 520 may wake up on a trigger and may transmit a formatted data block to the MTC server 506 during an uplink time slot. The MTC WTRU 520 may include its unique identifier in the formatted data block. If the downlink time slot is contiguous, the MTC WTRU 520 may listen for a page on the downlink channel provisioned. The MTC WTRU 520 may go into a low power mode, such as a sleep mode, until the next timed trigger event.

The MTC server 506 may receive the formatted data block transmitted by the MTC WTRU 520 during a time slot allocated to the MTC WTRU 520. The MTC server 506 may forward the formatted data block to the MTC user 504 associated with the MTC WTRU 520. The MTC server 506 may use the routing information and the MTC WTRU 520 unique identifier to forward the formatted data block to the MTC user 504.

In an embodiment, the periodicity of the schedule message on the downlink time window may be longer than the periodicity of the uplink time slots. A schedule message may include information that may indicate multiple uplink or downlink paging opportunities.

In an embodiment, the schedule message may be provided via broadcast. The MTC server 506 may periodically provide a complete set of the scheduling information to the M2M groups via the cellular network broadcast system "Broadcast server" in a broadcast message.

The MTC WTRU 520 may periodically listen to the configured broadcast service. An MTC WTRU 520 may read and save specific schedule information from a received broadcast message that may include a time slot on the uplink (e.g. Tx) and downlink (e.g. paging) channel. The MTC WTRU 520 may identify schedule information in the received broadcast message, for example, by using the unique identifier of the MTC WTRU 520. The MTC WTRU 520 may read and save the time for the next broadcast message occurrence. The MTC server 506 may provide for time-triggered events to notify the MTC WTRU 520 prior to upcoming uplink and downlink time slots and upcoming broadcast messages. The MTC WTRU 520 may go into a low power mode, such as a sleep mode.

The MTC WTRU 520 may wake up on a trigger and may transmit a formatted data block to the MTC server 506 during its uplink time slot. The MTC WTRU 520 may include its unique identifier in the formatted data block. If the downlink time slot is contiguous, the MTC WTRU 520 may listen for a page on the downlink channel provisioned. The MTC WTRU 520 may go into a low power mode, such as a sleep mode, until the next timed trigger event.

The MTC server 506 may receive the formatted data block transmitted by the MTC WTRU 520 during a time slot allocated to the MTC WTRU 520. The MTC server 506 may forward the formatted data block to the MTC user 504 associated with the MTC WTRU 520. The MTC server 506 may use the routing information and the MTC WTRU unique identifier to forward the formatted data block to the MTC user 504.

In an embodiment, the periodicity of the schedule message on the downlink time window may be longer than the periodicity of the uplink time slots. A schedule message may include information that may indicate multiple uplink or downlink paging opportunities.

In an embodiment, the MTC WTRU 520 may receive data from the MTC user 504 via broadcast. For example, the MTC user 504 may periodically or asynchronously send data/message to the MTC server 506 for transmission to the MTC WTRUs 520 of one or more M2M groups 512. The data/message from the MTC user 504 may include MTC user 504 formatted data block. The MTC user 504 may include unique identifiers associated with the M2M groups 512.

The MTC server 506 may provision a time window or windows on a downlink channel or channels such that the MTC WTRUs 520 may receive the formatted data block. The MTC server 506 may acquire new or additional cellular resources, if the existing or presently allocated resources are insufficient. For example, resources may include information that the access network may provide to set up an additional channel. The MTC server 506 may create schedule information for the data block. The MTC server 506 may include this schedule information in a next schedule message to the M2M group 512 in the time window associated with the M2M group 512 on the provisioned downlink channel. The MTC server 506 may use the unique identifier associated with the M2M group 512 to identify the correspondence between an M2M group 512 and a corresponding time window. The MTC server 506 may send the formatted data block through the access network during the time window on the provisioned channel.

The MTC WTRUs 520 of the M2M group 512 may wake up on a trigger and may listen during the time window allocated to the M2M group 512 on the downlink channel provided in a previously received schedule message. An MTC WTRU 520 may read and save specific schedule information from the formatted data block, including a time slot on the uplink and downlink channel. The MTC WTRU 520 may identify schedule information associated with the MTC WTRU 520 in the formatted data block, for example, by using the unique identifier of the MTC WTRU 520. The MTC WTRU 520 may read and save the time and channel information for a next time window allocated to the M2M group 512. The MTC server 506 may provide for time-triggered events to notify the MTC WTRU 520 prior to upcoming uplink and downlink time slots and upcoming time windows. The MTC WTRU 520 may go into a low power mode, such as a sleep mode.

The MTC WTRU 520 may wake up on a trigger event and may listen during the time window allocated to the M2M group 512 on the downlink channel provided in the previously received schedule message. The MTC WTRU 520 may receive the MTC user 504 formatted data block. The MTC WTRU 520 may act on or save the MTC user 504 formatted data block.

In an embodiment, an MTC WTRU 520 may establish a direct dedicated connection to the MTC user 504. For example, the MTC user 504 may notify the MTC server 506 that the MTC user 504 requires a direct link to an MTC WTRU 520. The notification to the MTC server 506 may include a unique identifier associated with the MTC WTRU 520.

The MTC server 506 may determine when the next downlink time slot for the indicated WTRU 520 may be available. The MTC server 506 may send a page to the MTC WTRU 520 indicated during the time slot.

The MTC WTRU 520 may wake up on a trigger event and may listen during a time slot on the downlink channel provided in a previously received schedule message. The MTC WTRU 520 may receive the MTC server page. The MTC WTRU 520 may establish an IP connection through the access network using dedicated cellular resources. The MTC WTRU 520 may establish communication with the MTC user 504 application via the IP connection.

Though the example embodiments described herein are carried out in the context of IP address, it is to be understood that the technique applies to other network addresses. While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:

1. A machine-type communication (MTC) server for performing group-based communication, the MTC server comprising:
    a processor configured to:
        send a radio resource request for communicating with an MTC group that comprises a plurality of MTC wireless transmit/receive units (WTRUs);
        receive an indication of radio resources allocated for the MTC group, wherein the radio resources allocated for the MTC group comprises a channel that is dedicated to the MTC group for sending data in an uplink, and the indication of radio resources indicates a time window during which the channel is dedicated to the MTC group for sending data in the uplink;
        send, to a first MTC WTRU in the MTC group, information indicative of the radio resources allocated for the MTC group and a first time slot within the time window allocated to the first MTC WTRU; and
        send, to a second MTC WTRU in the MTC group, information indicative of the radio resources allocated for the MTC group and a second time slot within the time window allocated to the second MTC WTRU.

2. The MTC server of claim 1, wherein the processor is further configured to:
    allocate the first time slot to the first MTC WTRU in the MTC group for uplink communication; and
    allocate the second time slot to the second MTC WTRU in the MTC group for uplink communication.

3. The MTC server of claim 1, wherein the processor is further configured to:
    receive a first data from the first MTC WTRU during the first time slot via the channel that is dedicated to the MTC group; and
    receive a second data from the second MTC WTRU during the second time slot via the channel that is dedicated to the MTC group.

4. The MTC server of claim 1, wherein the processor is further configured to:
    determine an amount of radio resources needed for the MTC group to send the data in the uplink; and
    include an indication of the determined amount of radio resources in the radio resource request.

5. A method for a machine-type communication (MTC) server to perform group-based communication, the method comprising:
    sending a radio resource request for communicating with an MTC group that comprises a plurality of MTC wireless transmit/receive units (WTRUs);
    receiving an indication of radio resources allocated for the MTC group, wherein the radio resources allocated for the MTC group comprises a channel that is dedicated to the MTC group for sending data in an uplink, and the indication of radio resources indicates a time window during which the channel is dedicated to the MTC group for sending data in the uplink;
    sending, to a first MTC WTRU in the MTC group, information indicative of the radio resources allocated for the MTC group and a first time slot within the time window allocated to the first MTC WTRU; and
    sending, to a second MTC WTRU in the MTC group, information indicative of the radio resources allocated for the MTC group and a second time slot within the time window allocated to the second MTC WTRU.

6. The method of claim 5, further comprising:
    allocating the first time slot to the first MTC WTRU in the MTC group for uplink communication; and
    allocating the second time slot to the second MTC WTRU in the MTC group for uplink communication.

7. The method of claim 5, further comprising:
    receiving a first data from the first MTC WTRU during the first time slot via the channel that is dedicated to the MTC group; and
    receiving a second data from the second MTC WTRU during the second time slot via the channel that is dedicated to the MTC group.

8. The method of claim 5, further comprising:
    determining an amount of radio resources needed for the MTC group to send the data in the uplink; and
    including an indication of the determined amount of radio resources in the radio resource request.

9. A machine-type communication (MTC) server for performing group-based communication, the MTC server comprising:
    a processor configured to:
        send, to a core network, a radio resource request associated with an MTC group that comprises a plurality of MTC wireless transmit/receive units (WTRUs);

receive an indication of radio resources allocated for the MTC group to receive data via a radio access network, wherein the radio resources allocated for the MTC group is dedicated to the MTC group during a time window; and send a group message to the MTC WTRUs in the MTC group via the radio resources allocated for the MTC group during the time window.

10. The MTC server of claim 9, wherein the radio resources allocated for the MTC group comprises a channel for the MTC group to receive data directed to the MTC group during the time window.

11. A machine-type communication (MTC) server for performing group-based communication, the MTC server comprising:

a processor configured to:
send a radio resource request associated with an MTC group that comprises a plurality of MTC wireless transmit/receive units (WTRUs);
receive an indication of radio resources allocated for the MTC group to receive data via a radio access network, wherein the radio resources allocated for the MTC group is dedicated to the MTC group during a time window;
send, to the MTC WTRUs in the MTC group, information indicative of the time window and the radio resources allocated for the MTC group; and
send a group message to the MTC WTRUs in the MTC group via the radio resources allocated for the MTC group during the time window.

12. The MTC server of claim 11, wherein the radio resources allocated for the MTC group comprises a channel for the MTC group to receive data directed to the MTC group during the time window.

13. The MTC server of claim 11, wherein the radio resource request is sent to a core network.

14. A method for a machine-type communication (MTC) server to perform group-based communication, the method comprising:

sending, to a core network, a radio resource request associated with an MTC group that comprises a plurality of MTC wireless transmit/receive units (WTRUs);
receiving an indication of radio resources allocated for the MTC group to receive data via a radio access network, wherein the radio resources allocated for the MTC group is dedicated to the MTC group during a time window; and
sending a group message to the MTC WTRUs in the MTC group via the radio resources allocated for the MTC group during the time window.

15. The method of claim 14, wherein the radio resources allocated for the MTC group comprises a channel for the MTC group to receive data directed to the MTC group during the time window.

16. A method for a machine-type communication (MTC) server to perform group-based communication, the method comprising:

sending a radio resource request associated with an MTC group that comprises a plurality of MTC wireless transmit/receive units (WTRUs);
receiving an indication of radio resources allocated for the MTC group to receive data via a radio access network, wherein the radio resources allocated for the MTC group is dedicated to the MTC group during a time window;
sending, to the MTC WTRUs in the MTC group, information indicative of the time window and the radio resources allocated for the MTC group; and
sending a group message to the MTC WTRUs in the MTC group via the radio resources allocated for the MTC group during the time window.

17. The method of claim 16, wherein the radio resources allocated for the MTC group comprises a channel for the MTC group to receive data directed to the MTC group during the time window.

18. The method of claim 16, wherein the radio resource request is sent to a core network.

* * * * *